May 21, 1929. H. D. CURTIS. Re. 17,297

SNOW REMOVER.

Original Filed May 25, 1920

4 SHEETS—SHEET 1.

Benj. Kahn

L. B. Muddiliti

WITNESS

H. D. Curtis INVENTOR

BY Victor J. Evans

ATTORNEY

May 21, 1929. H. D. CURTIS. SNOW REMOVER. Re. 17,297
Original Filed May 25. 1920
4 SHEETS—SHEET 2.
Fig. 4.
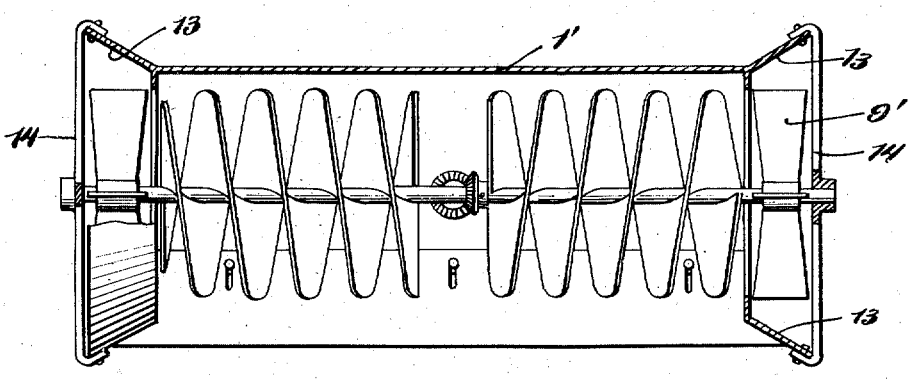
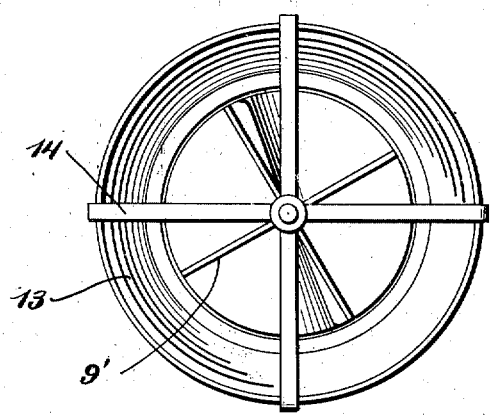
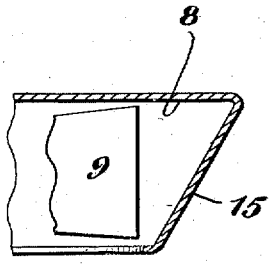
Fig. 3.
Fig. 5.
Benj. Kahn
L. B. Middleton
WITNESS:
H. D. Curtis INVENTOR
BY Victor J. Evans
ATTORNEY May 21, 1929. H. D. CURTIS. SNOW REMOVER. Re. 17,297

Original Filed May 25, 1920 4 SHEETS—SHEET 3.

Benj. Kahn
L. B. Middleton
WITNESS:

H. D. Curtis INVENTOR
BY Victor J. Evans
ATTORNEY

May 21, 1929. H. D. CURTIS. SNOW REMOVER. Re. 17,297

Original Filed May 25, 1920

4 SHEETS—SHEET 4.

R. A. Thomas

WITNESSES

H. D. Curtis INVENTOR

BY Victor J. Evans

ATTORNEY

Reissued May 21, 1929. Re. 17,297

UNITED STATES PATENT OFFICE.

HARRY D. CURTIS, OF OSHKOSH, WISCONSIN, ASSIGNOR TO JACOB WANDSCHEER, DANIEL WANDSCHEER, GERRIT WANDSCHEER, AND BEN WANDSCHEER, ALL OF SIOUX CENTER, IOWA.

SNOW REMOVER.

Original No. 1,413,007, dated April 18, 1922, Serial No. 384,219, filed May 25, 1920. Application for reissue filed April 2, 1928. Serial No. 266,735.

This invention relates to snow plows for steam and street railways, trucks and the like and the principal object of the invention is to provide spiral conveyor means for forcing the snow to one or both sides of the track or road.

Another object of the invention is to provide blower means for receiving the snow from the conveyor means and for blowing the snow to a distant point.

In a further aspect, the invention contemplates a novel method of removing snow from road surfaces, whereby the snow is completely taken up and subsequently automatically scattered at points remote from the road bed so as to eliminate banks and piles at the side of the road.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a sectional view taken on line 3—3 of Figure 1.

Figure 4 is a sectional view showing a modified form of the plow.

Figure 5 is an end view of this form.

Figure 1:
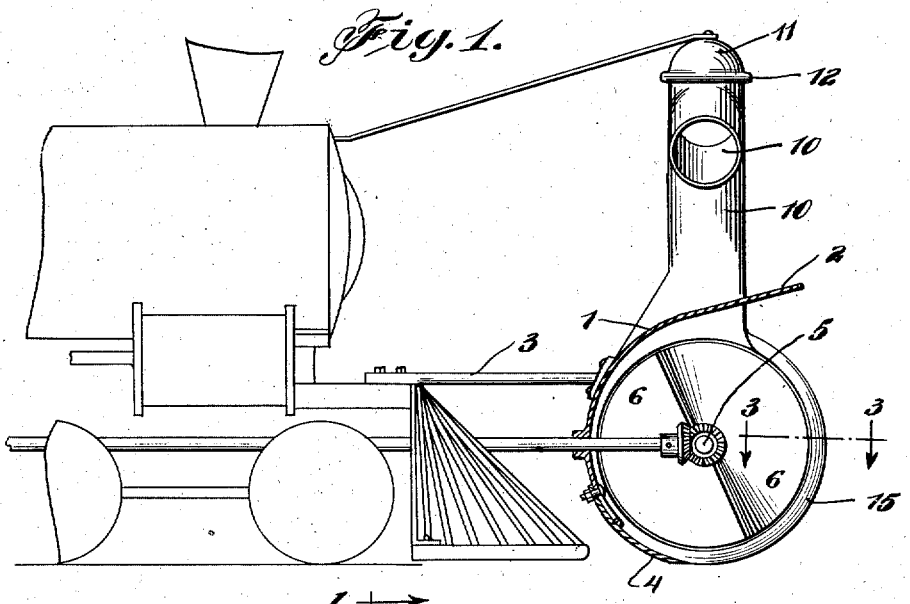
Figure 1 is a sectional view showing my blower located in front of a locomotive, the section being taken on line 1—1 of Figure 2.
Figure 2:
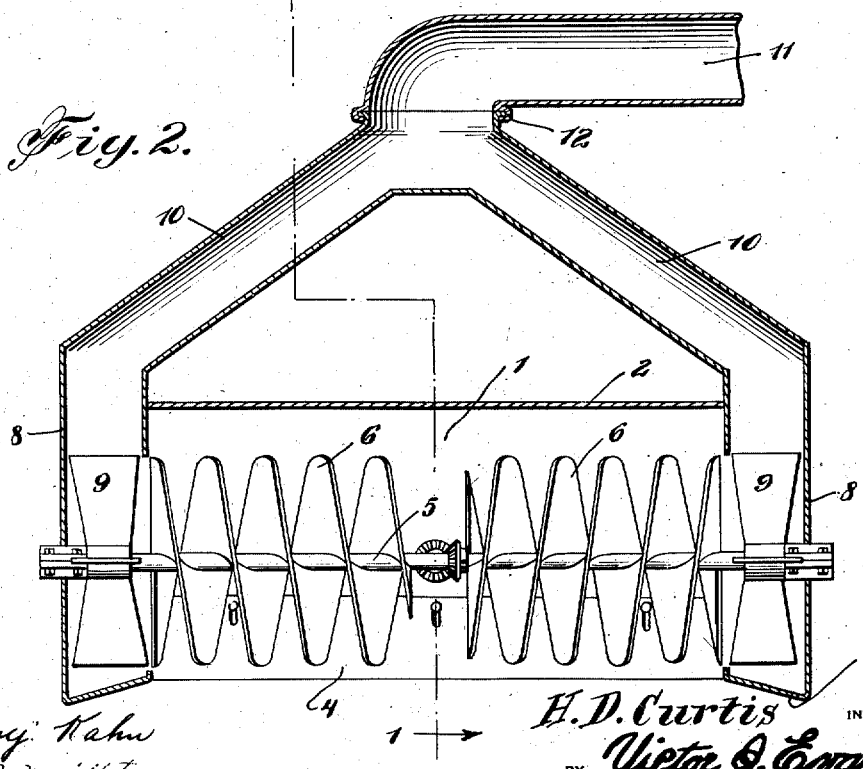
Figure 2 is a sectional view of one form of the invention.

In these views 1 indicates a casing which has its lower portion of substantially semi-cylindrical form in cross section with its upper part inclining upwardly and outwardly as at 2. This casing is supported in any suitable manner in front of the engine, street car, automobile, or other vehicle so that it will scoop up the snow from the track or road in front of the vehicle. As shown in Figure 1 the casing is attached to the engine by the arms 3. The lower edge of the casing is provided with an adjustable shoe 4 so that the shoe may be brought adjacent the surface to be cleared of snow. A shaft 5 is suitably journaled in the said casing and this shaft carries the right and left hand screwed conveyors 6 which extend from a point adjacent the center of the shaft to the ends of the casing. This shaft is connected in any suitable manner with the source of power so that the shaft may be rotated.

It will thus be seen that the snow drifts or deposits will be cut by the blades of the conveyors and the snow thus severed will be forced towards each end of the casing by the conveyor blades. If the ends of the casing are open the snow will be deposited on each side of the track or road, but this is undesirable since it lines the edge of the road with heavy banks, and if the latter freeze the plow could not force through to remove later snow deposits.

I prefer, therefore, to attach a casing 8 at each end of the casing 1 and to extend the ends of the shaft 5 through these casings. These extended ends of the shaft carry fan blades 9 so that a blast is created in each casing to drive the snow delivered to the casings by the conveyors through the outlet pipes 10 and the delivery pipe 11 which is connected with said pipes 10 by the rotary elbow 12. In this way the removed snow may be hurled and scattered at any desired point on either side of the road bed and at a distance therefrom.

In the modification shown in Figures 4 and 5 the ends of the casing 1′ may be left open so that the fan 9′ will throw the snow from each end of the casing as the snow is delivered to them by the conveyors. I may place deflector plates 13 around the upper portion of the casing at the ends thereof to prevent snow from being thrown back upon the plow or the vehicle. In this form a spider 14 is placed at each end of the casing to carry the journals for the shaft.

Figure 6:
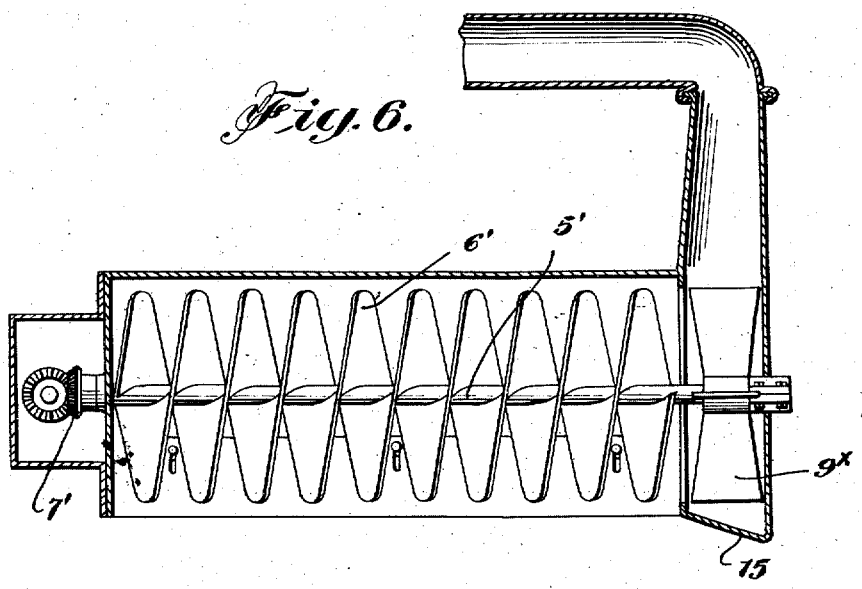
Figure 6 is a sectional view of a further modification.
Figure 7:
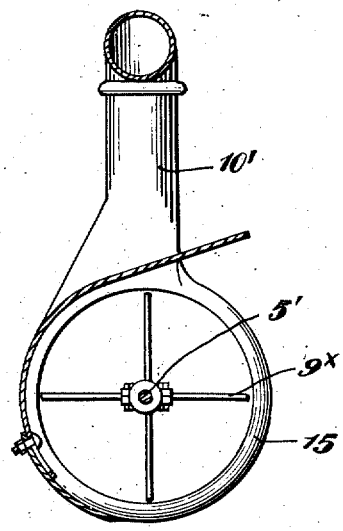
Figure 7 is a sectional view through this modification.

In the modification shown in Figures 6 and 7 the shaft 5′ carries but one conveyor blade 6′ which delivers the snow to one end of the casing. The gear 7′ is located at one end of the shaft and a fan 9× may be connected with the other end so as to deliver the snow received from the conveyor to the outlet pipe 10′. I may use scooping side plates 15 at the ends of the casing for protecting the journals and the gear and fan from the snow, said plates forcing the snow to the conveyor.

It will thus be seen that as the plow is driven through the snow on the track or road the spiral screws will cut the snow and move it transversely of the road bed, and if the blower device is used, the removed snow can be delivered to a distant point so as to remove the the danger of the banked snow at the side of track falling back upon the track, and blocking future passage of the plow.

Figure 8:
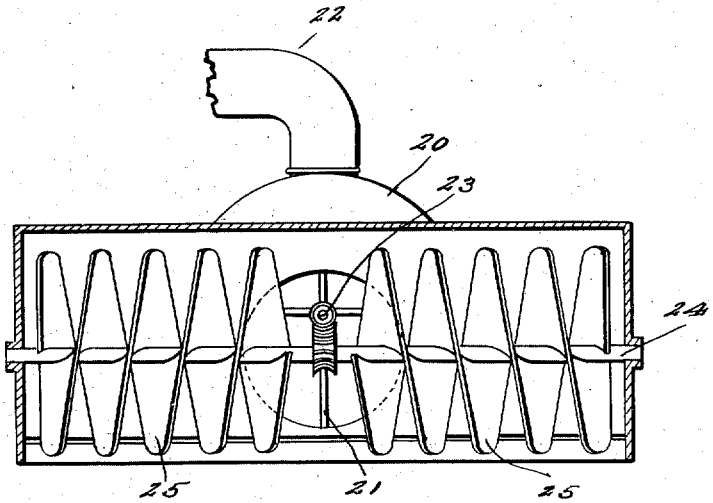
Figure 8 is a sectional view of another modification.
Figure 9:
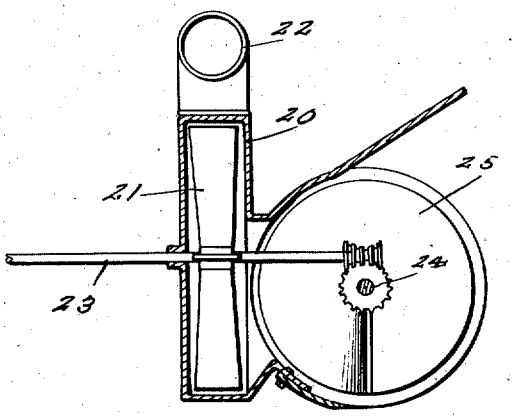
Figure 9 is a sectional view through this modification.

In the modification shown in Figures 8 and 9 a double conveyor is used which is so arranged as to feed the snow to the center of the casing. A fan casing 20 is connected with the rear of the conveyor casing, at the center thereof, and the fan 21 therein acts to draw the snow from the conveyor casing and then discharge it from the outlet 22 at the top of the fan easing. This fan has its shaft 23 geared to the shaft 24 on which the conveyors 25 are carried. The fan shaft is connected in any desired manner with a source of power. This arrangement is perhaps the most efficient of all the forms illustrated. By moving the snow toward the center of the plow from each end, the plow is more readily guided as the force on each side is substantially the same. Thus the tendency of the vehicle to slip off or toward the edge of the road is avoided.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A snow plow of the class described comprising a horizontally arranged semi-cylindrical casing, a fan casing connected therewith, a spiral conveyor in the first mentioned casing, a fan in the fan casing, means for actuating the conveyor and fan and an adjustable conduit connected with the fan casing.

2. A snow plow of the class described comprising a casing, a spiral conveyor therein formed of right and left hand parts and arranged to feed the snow to the center, a fan casing in the rear of the conveyor casing and connected with the center of said conveyor casing, a fan in said fan casing, an outlet for the fan casing and means for driving the fan and the conveyors.

3. A snow remover of the class described comprising a casing, a horizontally arranged spiral conveyor in said casing adapted to cut and feed snow transversely of the casing, a fan casing communicating with the horizontal casing and adapted to receive snow therefrom, said fan casing having an adjustable discharge opening, and a fan in the fan casing for discharging the snow from the latter.

4. A snow remover of the class described comprising a casing, a spiral conveyor therein formed of right and left hand parts and arranged to feed snow in opposite directions, a fan casing in the rear of the conveyor casing and communicating with the conveyor casing adjacent the point of meeting of the right and left hand parts of the conveyor, a fan in said fan casing, an outlet for the fan casing, and means for driving the fan and the conveyor.

5. A snow plow of the class described comprising a casing, a spiral conveyor therein formed of right and left hand parts and arranged to feed the snow to the center of the casing, the axis of the conveyor being horizontally arranged and extending transversely of the road bed, a fan casing in the rear of the conveyor casing and communicating with the center of said conveyor casing, a fan in said fan casing, an outlet for the fan casing, and means for actuating the fan and conveyor.

6. A snow remover of the class described comprising a power propelled vehicle, a horizontal casing mounted on the front of the vehicle and arranged transversely of the road bed, a fan casing in communication therewith, a horizontally arranged spiral conveyor in the first mentioned casing, a fan in the fan casing, an outlet in the fan casing communicating with the atmosphere, and means for actuating the conveyor and fan from the vehicle.

7. A snow remover of the class described comprising a power propelled vehicle, a main casing mounted on the front of the vehicle, a fan casing adjacent to and in communication with said main casing, a spiral conveyor in said main casing adapted to cut snow and feed it in the direction of the axis of the conveyor and toward the fan casing, an outlet in the fan casing, and a fan within the fan casing for discharging snow through said outlet, and means for actuating the conveyor and fan from the vehicle.

8. A snow remover of the class described comprising a power propelled vehicle, a main horizontal casing, a spiral conveyor in said casing, a fan casing adjacent to the main casing and having an inlet opening in communication with the main casing, said conveyor being adapted to cut snow and feed it toward the inlet opening of the fan casing and in the direction of the axis of the conveyor, an outlet in the fan casing, and a fan within the fan casing for discharging snow through said outlet, and means for actuating said spiral conveyor and fan from the vehicle.

In testimony whereof, I have hereunto set my signature.

HARRY D. CURTIS.